(12) United States Patent
Corlett et al.

(10) Patent No.: US 8,610,830 B2
(45) Date of Patent: Dec. 17, 2013

(54) VIDEO ROTATION METHOD AND DEVICE

(75) Inventors: Barry Corlett, San Francisco, CA (US);
David G Conroy, El Granada, CA (US);
Timothy J Millet, Mountain View, CA
(US); Michael Culbert, Monte Sereno,
CA (US)

(73) Assignee: Apple Inc., Cupertino, CA (US)

( * ) Notice: Subject to any disclaimer, the term of this patent is extended or adjusted under 35 U.S.C. 154(b) by 1388 days.

(21) Appl. No.: 12/317,811

(22) Filed: Dec. 30, 2008

(65) Prior Publication Data

US 2010/0060792 A1 Mar. 11, 2010

Related U.S. Application Data

(60) Provisional application No. 61/096,068, filed on Sep. 11, 2008.

(51) Int. Cl.
*H04B 1/00* (2006.01)

(52) U.S. Cl.
USPC .......................................... 348/583; 455/566

(58) Field of Classification Search
USPC ..................................... 375/340.25; 348/583
See application file for complete search history.

(56) References Cited

U.S. PATENT DOCUMENTS

| | | | |
|---|---|---|---|
| 4,168,488 A | 9/1979 | Evans | |
| 4,831,368 A | 5/1989 | Masimo et al. | |
| 5,189,404 A | 2/1993 | Masimo et al. | |
| 5,734,875 A | 3/1998 | Cheng | |
| 5,961,923 A * | 10/1999 | Nova et al. | 506/4 |
| 6,075,546 A | 6/2000 | Hussain et al. | |
| 6,331,857 B1 | 12/2001 | Hussain et al. | |
| 6,353,682 B2 * | 3/2002 | Klassen | 382/233 |
| 6,380,942 B1 | 4/2002 | Hussain et al. | |
| 6,442,302 B2 * | 8/2002 | Klassen | 382/296 |
| 6,512,884 B1 * | 1/2003 | Sawada | 386/203 |
| 6,563,535 B1 | 5/2003 | Anderson | |
| 6,611,272 B1 * | 8/2003 | Hussain et al. | 345/531 |
| 6,791,569 B1 | 9/2004 | Millet et al. | |
| 6,820,209 B1 | 11/2004 | Culbert et al. | |
| 6,941,019 B1 * | 9/2005 | Mitchell et al. | 382/232 |
| 6,972,768 B2 | 12/2005 | Hussain et al. | |
| 7,042,460 B2 | 5/2006 | Hussain et al. | |
| 7,529,948 B2 | 5/2009 | Conroy et al. | |
| 2002/0191031 A1 * | 12/2002 | Ricard | 345/838 |
| 2003/0235325 A1 * | 12/2003 | Ray et al. | 382/100 |

(Continued)

FOREIGN PATENT DOCUMENTS

WO PCT/US09/39162 4/2009

OTHER PUBLICATIONS

U.S. Appl. No. 12/319,940, filed Jan. 14, 2009, Timothy J. Millet.
U.S. Appl. No. 12/057,146, filed Mar. 27, 2008, David G. Conroy.

(Continued)

*Primary Examiner* — Eleni Shiferaw
*Assistant Examiner* — Phy Anh Vu
(74) *Attorney, Agent, or Firm* — Wong, Cabello, Lutsch, Rutherford & Brucculeri, LLP (57) ABSTRACT

A media processing system with an improved method and device for rotating a video image is provided. Embodiments of the media processing system include a video decoder with the ability to output decoded video in a landscape or portrait orientation. In some embodiments, the video output orientation is based on the physical orientation of the display as indicated by an electronic sensor.

16 Claims, 5 Drawing Sheets

(56) References Cited

U.S. PATENT DOCUMENTS

| | | | |
|---|---|---|---|
| 2004/0073873 A1* | 4/2004 | Croney et al. | 715/526 |
| 2004/0157647 A1* | 8/2004 | Takahashi | 455/566 |
| 2004/0247178 A1* | 12/2004 | Reese | 382/162 |
| 2005/0020317 A1* | 1/2005 | Koyama | 455/566 |
| 2005/0149878 A1* | 7/2005 | White et al. | 715/784 |
| 2005/0184993 A1* | 8/2005 | Ludwin et al. | 345/502 |
| 2006/0013568 A1* | 1/2006 | Rodriguez | 386/111 |
| 2006/0126120 A1* | 6/2006 | Imafuku et al. | 358/1.18 |
| 2006/0139371 A1* | 6/2006 | Lavine et al. | 345/620 |
| 2008/0008392 A1* | 1/2008 | Goel et al. | 382/232 |
| 2008/0030509 A1 | 2/2008 | Conroy et al. | |
| 2008/0164056 A1 | 7/2008 | Gettemy et al. | |
| 2009/0002311 A1 | 1/2009 | Barnhoefer et al. | |
| 2009/0002401 A1 | 1/2009 | Barnhoefer et al. | |
| 2009/0002403 A1 | 1/2009 | Barnhoefer et al. | |
| 2009/0002404 A1 | 1/2009 | Barnhoefer et al. | |
| 2009/0002555 A1 | 1/2009 | Barnhoefer et al. | |
| 2009/0002561 A1 | 1/2009 | Barnhoefer et al. | |
| 2009/0002565 A1 | 1/2009 | Barnhoefer et al. | |
| 2009/0079746 A1 | 3/2009 | Howard et al. | |
| 2009/0088204 A1 | 4/2009 | Culbert et al. | |

OTHER PUBLICATIONS

U.S. Appl. No. 12/185,656, filed Aug. 4, 2008, David G. Conroy.
U.S. Appl. No. 12/060,728, filed Apr. 1, 2008, David G. Conroy.
U.S. Appl. No. 12/102,714, filed Apr. 14, 2008, Haitao Guo.
U.S. Appl. No. 61/101,639, filed Sep. 30, 2008, Timothy J. Millet.
U.S. Appl. No. 61/096,068, filed Sep. 11, 2008, Barry Corlett.

* cited by examiner

VIDEO ROTATION METHOD AND DEVICE

This application claims benefit of Provisional Application Ser. No. 61/096,068, filed Sep. 11, 2008, entitled "Video Rotation Method and Device" in the name of Barry Corlett et al.

BACKGROUND

1. Technical Field

Embodiments of the present disclosure relate generally to electronic devices and, more specifically, to processing of video images in an electronic device.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The trend in consumer electronics is to combine multiple functionalities into a single portable electronic device. For example, cell phones and media players are no longer merely distinct devices, each with their own unique capabilities. Rather, cell phone and media player functionalities can now be merged into one multimedia device with a multitude of capabilities. Modern cell phone/media players are often packed with dozens of additional features which include: playing of audio and video, taking of still pictures, recording video, playing video games, GPS navigation, web surfing, downloading of streaming media from the Internet, Bluetooth and WiFi communications, emailing, text messaging, etc.

Multimedia devices often allow a user to display certain content in either a landscape or portrait display format. Therefore, in order to properly display some content, the device may include hardware and/or software for rotating graphical data, such as video, from its native orientation to a different orientation. The added computing steps involved in rotating the graphical data may tend to consume extensive computing resources and battery life, particularly when rotating video images, which may involve rotating several video frames per second.

SUMMARY

Certain embodiments are directed toward a multimedia device with a video decoder having the ability to decode video in landscape or portrait mode, thereby eliminating the need for an additional rotation process before sending video data to the display.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
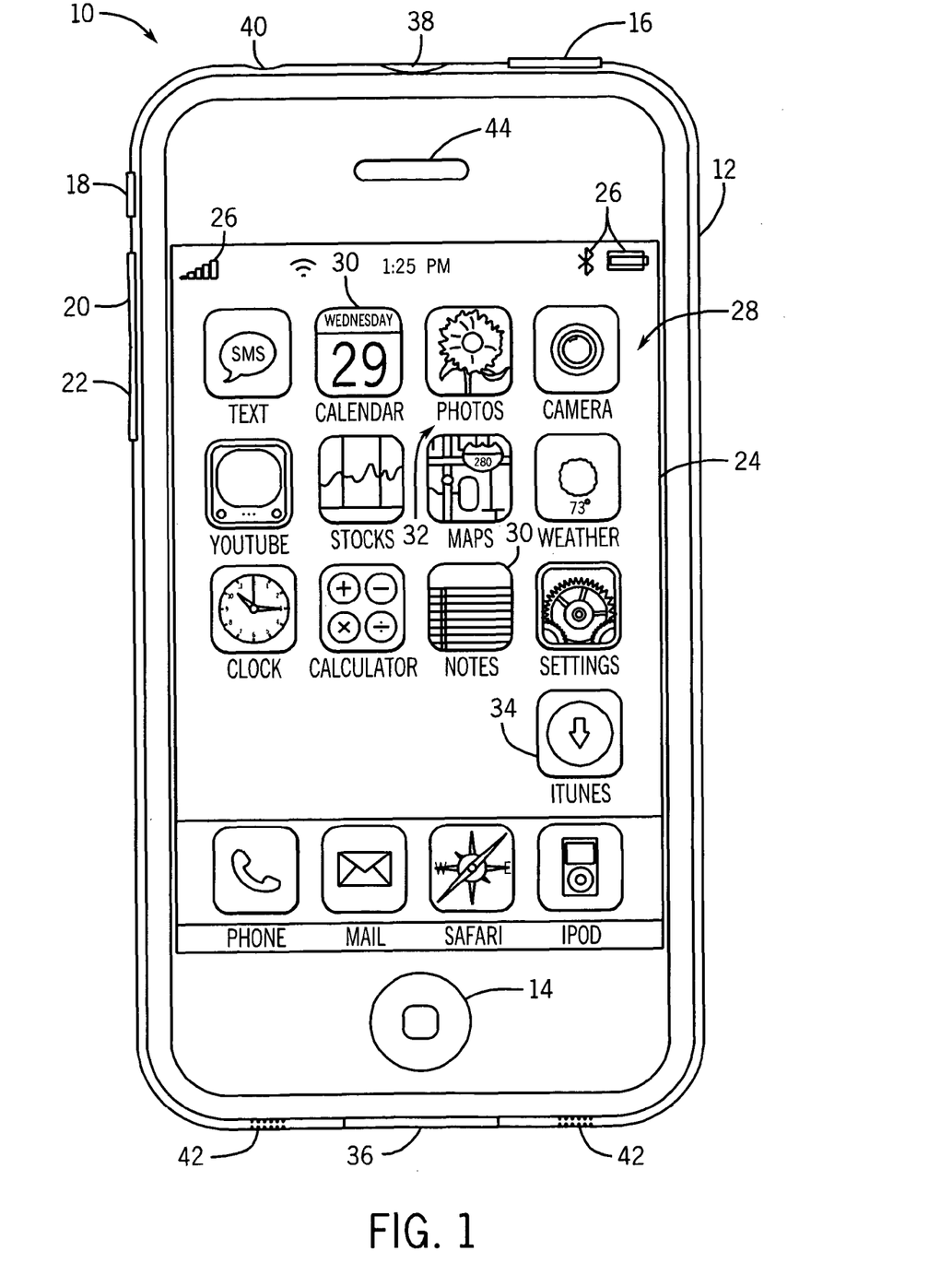
FIG. 1 is a perspective view of an example of a portable electronic multimedia device in accordance with an embodiment.

FIG. 1 illustrates an electronic device 10 that may include the video decoding techniques briefly mentioned above. As illustrated in FIG. 1, the electronic device 10 may be a handheld device incorporating the functionality of one or more portable devices, such as a media player, a cellular phone, a personal data organizer, and so forth. Depending on the functionalities provided by the electronic device 10, the user may listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication. By way of example, the electronic device 10 may be a model of an iPhone® available from Apple Inc. of Cupertino, Calif.

In the depicted embodiment, the device 10 is enclosed by a casing 12 that protects the interior components from physical damage and shields them from electromagnetic interference. The casing may be formed from any suitable material such as plastic, metal, or a composite. The casing allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 which may display various images generated by the device. For example, the display 24 may show photos, movies, album art, and/or data, such as text documents, spreadsheets, text messages, and email, among other things. The display 24 also may display system indicators 26 that provide feedback to a user, such as power status, signal strength, call status, external device connection, or the like. The display 24 may be any type of display such as a liquid crystal display (LCD), a light emitting diode (LED) display, an organic light emitting diode (OLED) display, or other suitable display. Additionally, the device 10 may include a touch screen disposed adjacent to the display 24, such that a user may select elements of the display 24 by touching them with the finger or a stylus.

The display 24 may be used to display a GUI 28 that allows a user to interact with the device. The GUI 28 may include various layers, windows, screens, templates, elements, or other components that may be displayed in all of or areas of the display 24. In certain embodiments, the user input structures 14, 16, 18, 20, and 22, may be used to navigate through the GUI 28. For example, the user input structures may include a wheel that allows a user to select graphical elements, shown here as icons 30, of the GUI 28. The icons 30 also may be selected via the touch screen.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 32 may be displayed on or near the graphical elements 30 to facilitate user interpretation of each graphical element 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the iTunes icon 34 is selected, the device 10 may launch an iTunes application with a menu displaying the various tools and features available in the iTunes program. For each application, screens may be displayed on the display 24 that include various user interface elements.

The electronic device 10 also may include various input/output ports 36, 38, and 40 that allow connection of the device 10 to external devices. For example, the input/output port 36 may be a proprietary connection port for transmitting and receiving data files, such as media files. The input/output port 38 may be a connection slot for receiving a subscriber identify module (SIM) card. The input/output port 40 may be a headphone jack that provides for connection of audio headphones. In other embodiments, the device 10 may include any number of input/output ports configured to connect to a variety of external devices, including but not limited to a power source, a printer, and a computer. In other embodiments, multiple ports may be included on a device. The ports may be any interface type such as a universal serial bus (USB) port, serial connection port, IEEE-1394 (Firewire) port, or AC/DC power connection port.

The electronic device 10 may also include various audio input and output elements. For example, input receivers 42 may include one or more microphones that receive user audio input such as a user's voice. Additionally, the electronic device may include one or more output transmitters 44. The output transmitters 44 may include one or more speakers for transmitting audio signals to a user. The input receivers 42 and the output transmitters 44 may operate together as audio elements of a telephone.

Figure 2A:
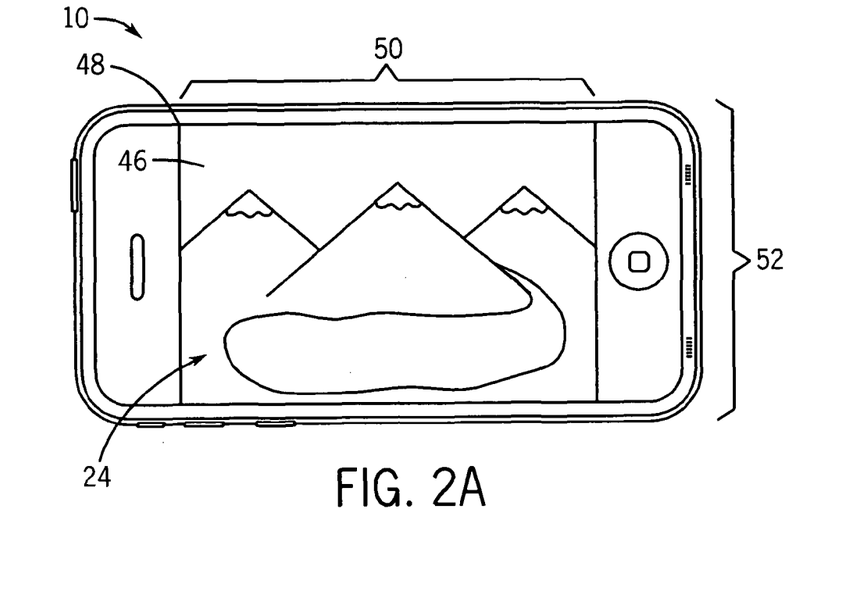
FIGS. 2A and 2B show two views of the portable electronic multimedia device of FIG. 1 demonstrating image rotation in accordance with an embodiment.
Figure 2B:
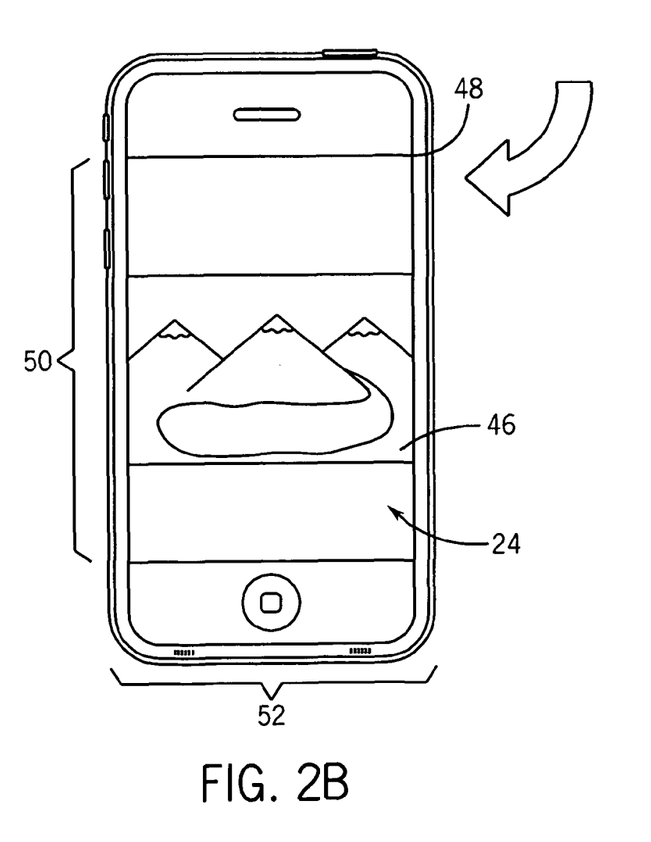

Turning now to FIGS. 2A and 2B, the electronic device 10 is shown in two physical orientations to demonstrate the display rotation feature of the electronic device 10. FIG. 2A shows the electronic device 10 in the horizontal, or landscape, orientation, where a video image 46 is generated on the display 24 with a landscape image orientation. The display 24 may be configured to generate the video image 46 by updating the individual pixels in sequence, starting with a corner pixel 48 and proceeding horizontally across the display 24 before continuing to the next row, or scan line.

FIG. 2B shows the electronic device 10 in the vertical, or portrait, orientation, where the image 46 is generated on the display 24 with a portrait image orientation. Because the dimensions of the image 46 do not match the dimensions of the display 24 in its rotated position, the image 46 is scaled so that the width of the image 46 matches the width of the display 24. Any unused portion of the display 24 may be set to black or some other specified background color. Although the image is rotated, the order in which the pixels of the display 24 is updated remains the same. In other words, the display 24 is updated starting at the corner pixel 48 and proceeding down the first scan line (now oriented vertically) before continuing to the next scan line. Because the pixels of the display 24 are updated in the same order regardless of the display orientation, the video data that make up image 46 is rearranged, as will be explained below, to cause the image 46 to be displayed with the appropriate image orientation.

For convenience, the present description assumes that the native image orientation is landscape and that the video image 46 is, therefore, rotated to be displayed in the portrait mode. This is not intended, however, to be a limitation. In some embodiments, the native image orientation may be portrait and the image 46 may be rotated to the landscape orientation.

Figure 3:
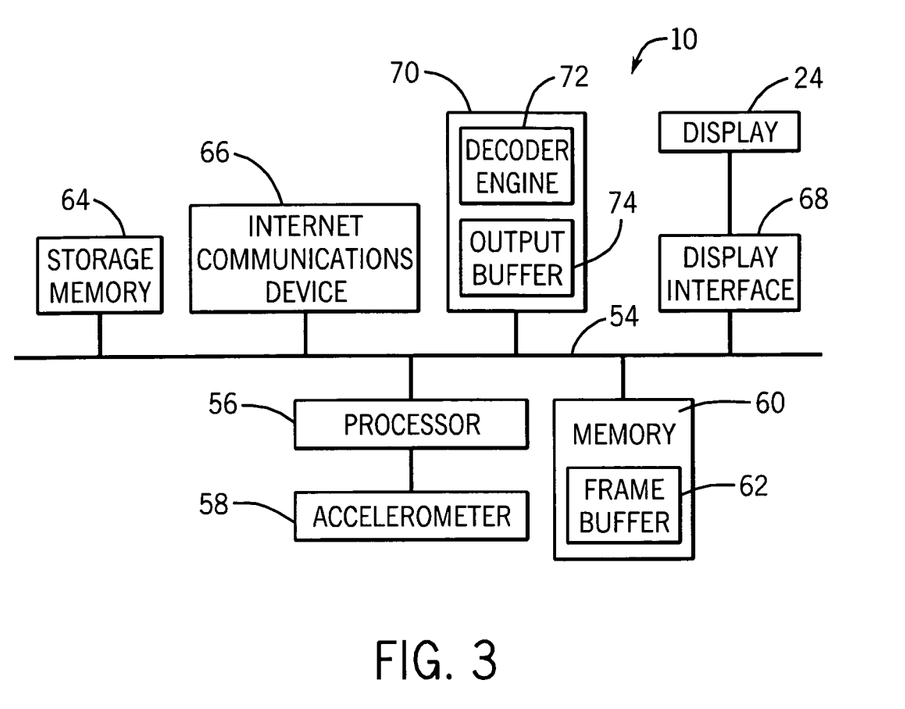
FIG. 3 is a block diagram of components of the portable electronic multimedia device of FIG. 1 in accordance with an embodiment.

Turning now to FIG. 3, a block diagram of circuitry that may be used in the electronic device 10 is provided. As seen in the block diagram, the electronic device 10 may include a data bus 54 to which most of the peripheral electronic components are communicatively coupled. The data bus 54 may combine the functionality of a direct memory access (DMA) bus and a programmed input/output (PIO) bus. In other words, the data bus 54 may facilitate both DMA transfers and direct CPU read and write instructions. In certain embodiments, the data bus 54 may be an Advanced Microcontroller Bus Architecture (AMBA) compliant data bus.

The electronic device 10 may also include a processor 56. The processor 56 may be any suitable general purpose microprocessor such as a Reduced Instruction Set Computer (RISC) from ARM Limited. The processor 56 runs the operating system of the electronic device 10 and manages the various functions of the electronic device 10. As such, it may be coupled to the data bus 54 and configured to transmit PIO instructions to the various devices coupled to the data bus 54. Additionally, the processor 56 may be configured to initiate DMA transfers.

The electronic device 10 may also include an accelerometer 58 coupled to the processor 56 and configured to detect a change in the physical orientation of the device 10, and hence the display 24. The display orientation may then be used by the processor 56 to determine the image orientation. In some embodiments, the image orientation may also be chosen by the user.

The electronic device 10 may also include a storage memory 64 connected to the data bus 54. The storage memory 64 may include flash memory, such as, for example, NOR or NAND flash memory, but may also include any suitable kind of electronic storage device, such as, for example, magnetic or optical disks. In certain embodiments, the storage memory 64 is used to store software applications and user files such as phonebook entries, pictures, audio files, ring tones, archived text messages and emails, etc. Moreover, the storage memory 64 may also be used to store compressed video.

Also coupled to the data bus 54 is an Internet communications device 66. The Internet communications device 66 may include any suitable method for communicating with the Internet. For example, the Internet communications device 66 may include a wireless communication device operating in accordance with IEEE 802.11 (WiFi) standards or an Ethernet communication device operating in accordance with IEEE 802.3 standards. The Internet communications device 66 may also include a Bluetooth device. Additionally, the Internet communication device may include a cell phone utilizing EDGE or UMTS technology. In some embodiments, Internet communication device 66 may perform only a portion of the task of communication with the Internet. For example, Internet communication device 66 may be only the physical communications link, and the rest of the task of communication with the Internet is performed by software executing on the processor 56.

Also coupled to the data bus 54 is a display interface 68 configured to receive decompressed video data and convert the data into a video signal that may be sent to the display 24. The display interface 68 may include, among other things, a scaler configured to fit the decompressed video data to the dimensions of the display 24. The scaler may be used, for example, to reduce the size of image data that has been rotated from a landscape to a portrait orientation as shown in FIG. 2B. The display interface 68 may also include a device for combining the video image with foreground or background images, such as GUI elements and background colors.

The electronic device 10 may also include a memory 60 coupled to the data bus 54 and configured to temporarily store one or more frames of video to be sent to the display 24. As such, the memory 60 may include one or more frame buffers 62. The memory 60 may include any suitable type of random access memory (RAM), such as double data rate synchronous dynamic RAM (DDR SDRAM), for example. The electronic device 10 may also include a memory controller for controlling the flow of data to and from the memory 60. Memory is generally used more efficiently when the memory locations are accessed consecutively (i.e., memory location X, X+1, X+2 . . . etc.) Therefore, frames of video are generally stored in the frame buffer 62 in the order in which they will be sent to the display 24.

Also connected to the data bus 54 is a video decoder 70. The video decoder 70 may be configured to decode, i.e. decompress, video data of various formats, such as H.264 video or MPEG video, for example. The video decoder 70 may include a decoder engine 72 which receives an encoded video signal and processes the video signal to form decompressed video data, such as RGB, YUV, YPbPr or YCbCr formatted video data, for example. The video decoder 70 may also include an output buffer 74 configured to temporarily hold the decompressed video data before sending the data to the memory 60. The video decoder 70 may be configured to transfer data from output buffer 74 into memory 60 in an order that is appropriate for display in portrait image orientation or for display in landscape image orientation. As will be explained further below, the transfer order controls whether the video image 46 is displayed in a portrait or landscape image orientation. Video decoder 70 may include a small output buffer 74 and transfer data between output buffer 74 and memory 60 in a less efficient fashion, or video decoder 70 may include a large output buffer 74 (perhaps large enough to hold a full frame of video data) and transfer data between output buffer 74 and memory 60 in a very efficient fashion.

In a particular embodiment, the video decoder 70 may include a programmable memory configured to control the transfer of video data from the output buffer 74, and the output buffer 74 may be large enough to hold one full frame of video data to increase the transfer efficiency. For example, assuming one byte per pixel and a video format of 640 by 480 pixels, the output buffer 74 may be greater than approximately 307 kb. In some embodiments, the pixel data may be read out of the output buffer 74 according to the transfer order. In other embodiments, the pixel data may be read out of the output buffer in sequential order and written into memory according to the transfer order.

During the playing of video, the video decoder 70 may receive compressed video from a source such as storage device 64 or Internet communications device 66, for example. As the video decoder 70 decompresses the received video data, it sends the decoded video to the output buffer 74. As will be discussed further below, the video decoder is capable of transferring the decoded video data out of the output buffer 74 and into the memory 60 in a portrait or landscape image orientation as shown in FIGS. 2A and 2B. The video decoder 70 receives an indication of the proper image orientation from the processor 56. The video decoder then transfers the video data out of the output buffer 74 and into the memory 60 according to the specified orientation. Because the video data may transferred in a portrait or landscape orientation, the device 10 does not need to include a separate rotation device for rotating images. This may save processing time, as well as device cost and complexity.

It should be noted that the device 10 may generally include various other components that are not described in the block diagram of FIG. 3. For example, the typical device 10 may also include cell phone capabilities, an audio system, and/or various user interface devices, among other things. Although it is beyond the scope of the present description to detail every possible combination of components that may be included in the electronic device 10, it will be appreciated that various components may be added or eliminated without deviating from the spirit and scope of the present disclosure. It should also be noted that some or all of the components described in FIG. 3 may be implemented in a system on a chip (SOC), for example.

Figure 4:
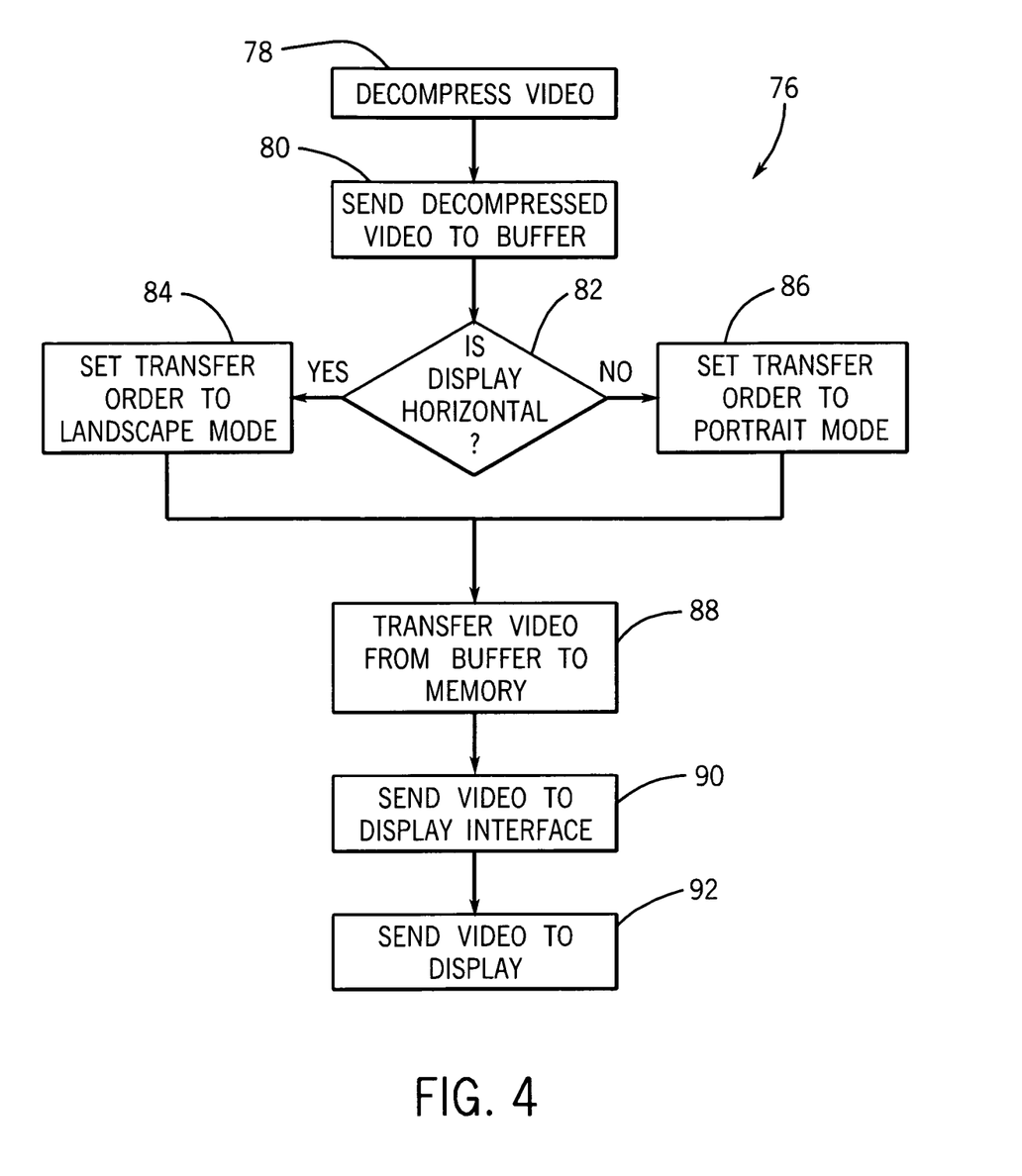
FIG. 4 is a flow chart of a method for rotating video data performed by the device of FIG. 1 in accordance with an embodiment.

Turning now to FIG. 4, an example of a method for processing video in accordance with an embodiment is depicted. Process 76 begins at step 78 in which video data is decompressed by the video decoder 70. Next, at step 80, decoded video is sent to the output buffer 74. At step 82, it is determined whether the display 24 is horizontal, as shown in FIG. 2A. If the display 24 is horizontal, the transfer order is set to landscape mode in step 84. If the display 24 is vertical, however, as shown in FIG. 2B, the transfer order is set to portrait mode in step 86.

Next, at step 88, data is transferred from the output buffer 74 to the memory 60 according to the specified transfer order, which will depend on the image orientation. In some embodiments, the transfer order for the landscape mode is the same order in which the data is received and decoded. Therefore, when displaying video in the landscape mode, no reordering of the video data occurs. Conversely, the transfer order for the portrait mode will be non-consecutive. Specifically, as will be described further in relation to FIG. 5, the transfer order will be such as to transform the video image from a landscape orientation to a portrait orientation.

Next, at step 90, the video data is sent from the memory 60 to the display interface 68. To use the memory 60 efficiently, the video data may be read from consecutive memory locations of the memory 60. The display interface 68 may then further process the video data to generate a video signal that may be sent to the display 24. For example, the display interface 68 may scale the video data to fit the display 24. Finally, at step 92 video is sent to the display 24.

Figure 5:
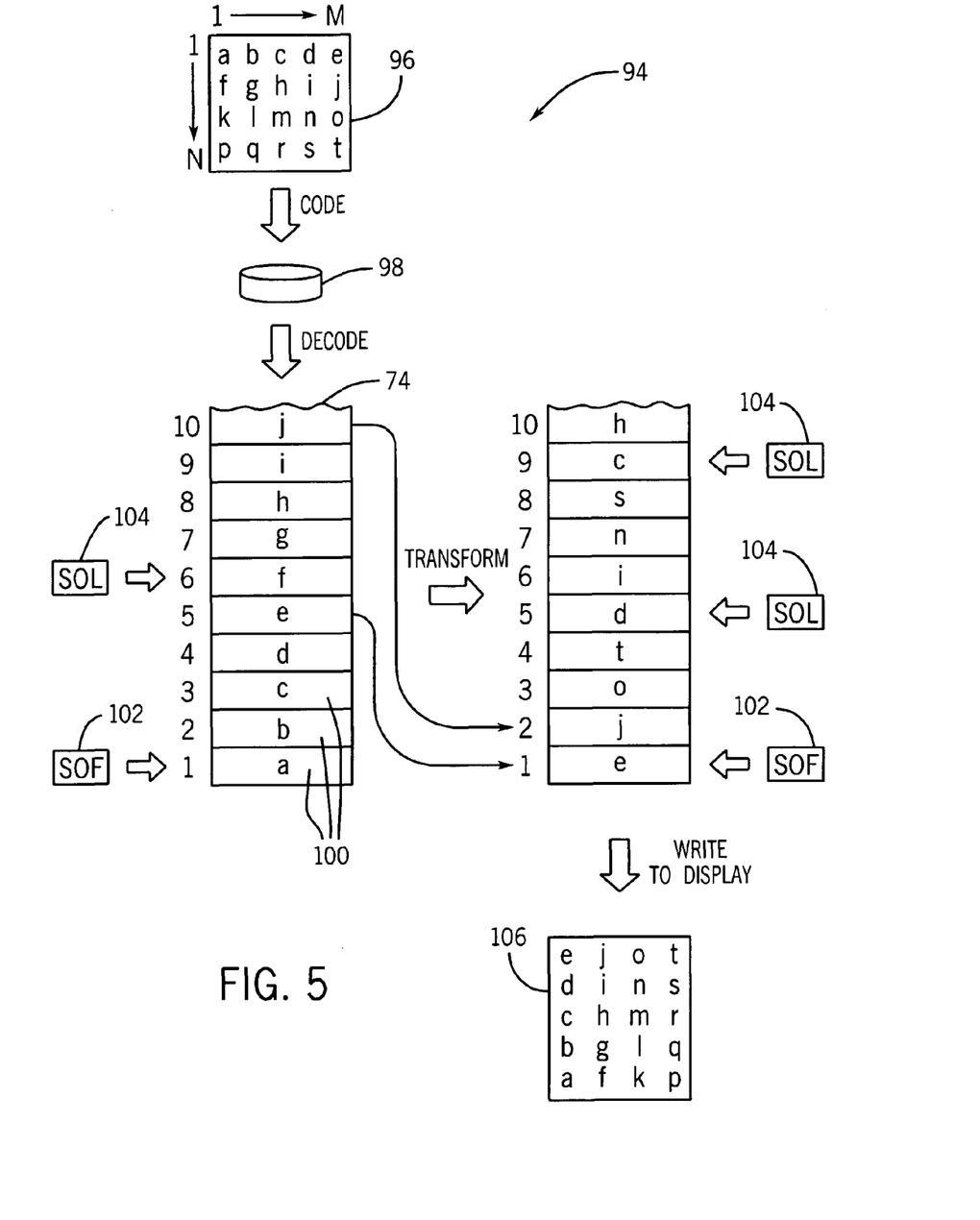
FIG. 5 is a diagram of a method for rotating video data performed by the device of FIG. 1 in accordance with an embodiment.

Turning now to FIG. 5, a method of rotating video when the transfer order is set to portrait mode at step 86 is illustrated in accordance with embodiments. Process 94 starts with the input pixel matrix 96, which represents a single frame of video that is M pixels wide and N pixels high. For convenience, M equals five and N equals four in the given example, however, it will be understood that a typical video frame may contain several thousand pixels. For example, a typical video frame may be 640 pixels wide by 480 pixels high. It will be understood, that each pixel may be defined by one or more bytes of video data, such as RGB data. For illustrative purposes, the data that defines each pixel is represented in FIG. 5 by a letter.

Process 94 begins with the input pixel matrix being coded to form a compressed video 98. The compression of the video data may occur within the device 10 or may occur separately. To play the video, the compressed video 98 is first decoded by the decoder engine 72 and sent to the output buffer 74. The decoded video is stored in consecutive memory locations 100 according to the order in which the input pixel matrix would be sent to the display in the landscape display mode. Furthermore, a start-of-frame indicator 102 identifies the memory location where the first pixel is stored, and a start-of-line indicator 104 identifies the memory location where the first pixel of each line is stored. Together, the start-of-frame and start-of-line indicators 102 and 104 define the dimensions of the input pixel matrix and may be used to ensure that each pixel appears in the proper location on the display 24.

After a sufficient amount of data has been decoded and sent to the output buffer 74, the video data is transferred to memory 60. In the present embodiment, the video image is to be rotated ninety degrees; therefore, the video data undergoes a ninety-degree transformation. During the transformation, pixel data is written into consecutive memory locations in the memory 60, but the data is read from the output buffer 74 in a non-consecutive order that produces a ninety-degree image rotation. For example, as shown in FIG. 5, pixel "e" at memory location 5 of the output buffer 74 is read first and sent to memory location 1 of the memory 60. Pixel "j" at memory location 10 of the output buffer 74 is read second and sent to memory location 2 of the memory 60. The process continues until all of the pixel data has been sent to the memory 60 in reordered form. In alternative embodiments, pixel data is read from consecutive locations in output buffer 74 and written to non-consecutive locations in memory 60 in an order the produces a 90-degree rotation.

In one embodiment, the reordering of the pixel data may be accomplished according to the following formula:

$$i = M \cdot \left(1 + \text{Mod}\left(\frac{i_2 - 1}{N}\right)\right) - \text{Trunc}\left(\frac{i_2 - 1}{N}\right)$$

where M equals the number of pixels per scan line in the original image; N equals the number of scan lines in the original image; i equals the original memory location in the data buffer 74; and i2 equals the new memory location in memory 60. The above formula assumes that the starting memory location, i.e. the memory location for the first pixel in the frame, equals one. It should also be noted that the 'Mod' function returns a remainder, and the 'Trunc' function returns a truncated whole number. Using the above formula, the read-out order of the output buffer 74 may be determined by incrementing i2 from 1 to the product of N times M and calculating the resulting value for i.

In addition to reordering the pixel data, the start-of-line indicator 104 will be set equal to multiples of 'N' rather than multiples of 'M.' After the video data is rearranged in memory 60 according to the above process, the data is ready to be sent to the display 24. Reading the video data from memory 60 in consecutive order will produce the output pixel matrix 106, which is rotated ninety degrees from the input pixel matrix 96.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A hand-held electronic device, comprising:
 a decoder engine configured to receive a compressed video signal and generate decompressed video data corresponding with a video image;
 an output buffer coupled to the decoder engine and configured to receive the decompressed video data from the decoder engine and output the decompressed video data to a frame buffer; and
 a programmable memory programmed to cause the decoder engine to determine an order by which to send the decompressed video data from the output buffer to the frame buffer; and
 a video display coupled to the frame buffer and configured to receive the decompressed video data from the frame buffer and generate the video image;
 wherein the decoder engine is configured to rotate the video image according to a specified image orientation, and wherein the decoder engine is configured to rotate the video image by sending the decompressed video data to the frame buffer in a rotated order.

2. The hand-held electronic device of claim 1, further comprising a sensor configured to sense a physical orientation of the video display, and wherein the specified image orientation is based on the physical orientation of the video display as determined by the sensor.

3. The hand-held electronic device of claim 2, wherein the sensor comprises an accelerometer.

4. The hand-held electronic device of claim 1, wherein the frame buffer receives the decompressed video data from the decoder engine in either a landscape or portrait image orientation.

5. The hand-held electronic device of claim 1, wherein the output buffer holds approximately one frame of the decompressed video data.

6. A video decoder, comprising:
 a video decoder engine configured to receive a compressed video signal and generate decompressed video data corresponding with a video image;
 an output buffer coupled to the video decoder engine and configured to receive the decompressed video data from the video decoder engine and output the decompressed video data to a frame buffer; and a programmable memory programmed to cause the video decoder engine to determine an order by which to send the decompressed video data from the output buffer to the frame buffer, wherein the video decoder engine is configured to calculate a rotated order depending on a specified video image orientation and transfer the decompressed video data from the output buffer to the frame buffer according to the rotated order.

7. The video decoder of claim 6, further comprising an input configured to receive the specified video image orientation.

8. The video decoder of claim 6, wherein the rotated order causes the video image to be rotated by ninety degrees.

9. The video decoder of claim 6, wherein the size of the output buffer is approximately equal to the size of the frame buffer.

10. The video decoder of claim 6, wherein the output buffer receives the decompressed video data from the video decoder engine in a landscape image orientation and outputs the decompressed video data in a portrait image orientation.

11. A method of processing video data, comprising:
obtaining decompressed video data from a video decoder, the decompressed video data corresponding with a video image;
storing the decompressed video data in a first block of memory coupled to the video decoder;
determining an image orientation by the video decoder;
calculating a rotated order by the video decoder based on the image orientation, wherein the rotated order is a rotation of the decompressed video data from a portrait order to a landscape order or from a landscape order to a portrait order; and
sending the decompressed video data from the first block of memory to a second block of memory according to the rotated order; and
sending the decompressed video data from the second block of memory to a display in an order in which the decompressed video data is held in the second block of memory.

12. The method of claim 11, comprising determining a start-of-line parameter based on the image orientation.

13. The method of claim 11, wherein the rotated order causes the video image to be rotated ninety degrees.

14. The method of claim 11, wherein the rotated order causes the video image to be displayed in a portrait orientation.

15. The method of claim 11, wherein determining the image orientation comprises obtaining a signal from a sensor configured to determine a physical orientation of a display.

16. The method of claim 11, further comprising scaling the decompressed video data to fit the video image to the display.

* * * * *